June 26, 1962 E. E. DILLMAN ET AL 3,040,592
VALVE ACTUATING MECHANISM
Filed April 10, 1958 4 Sheets-Sheet 1

Edward E. Dillman
Dan Ringo
INVENTORS

BY Hayden & Pravel

ATTORNEYS

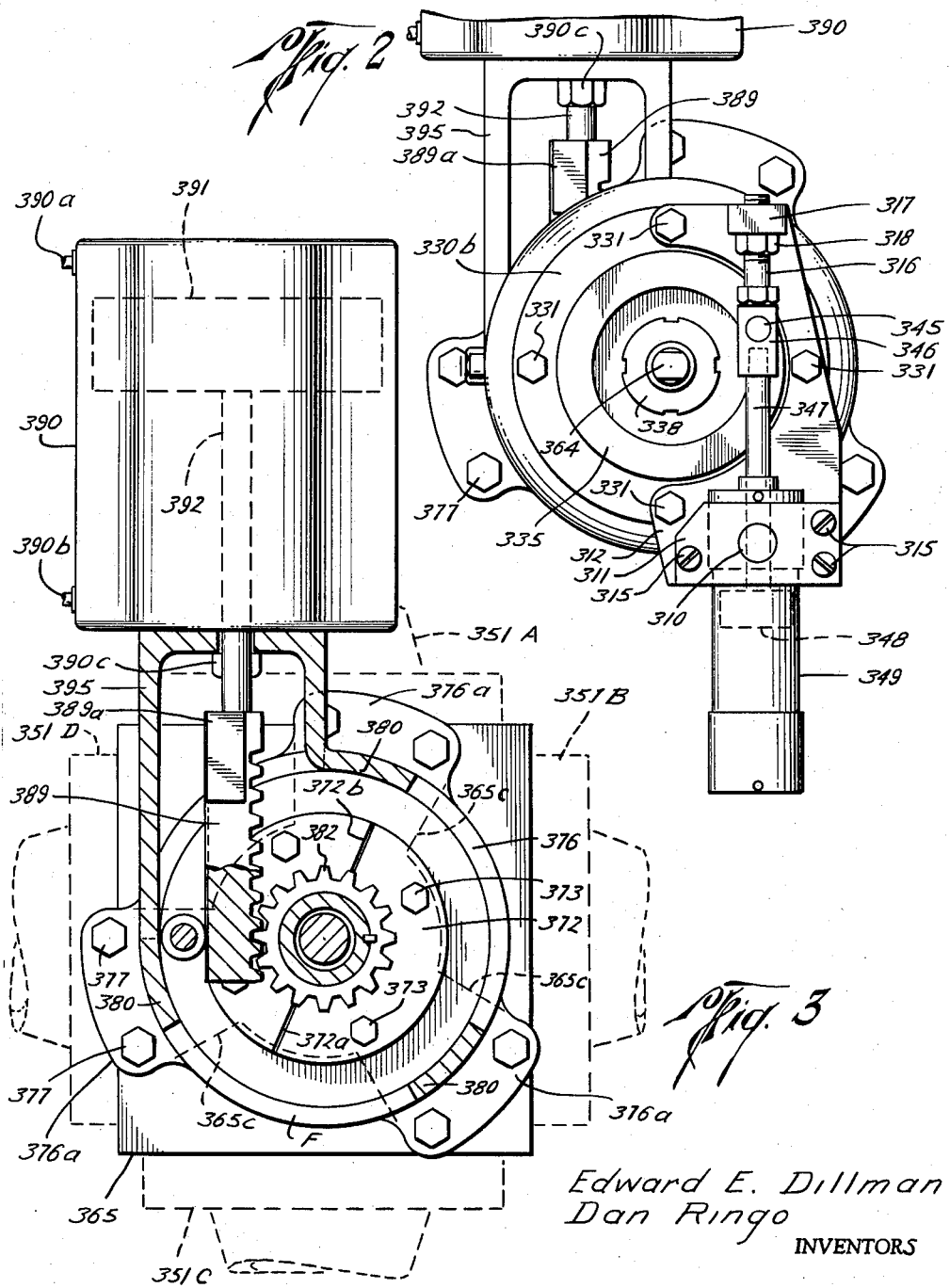

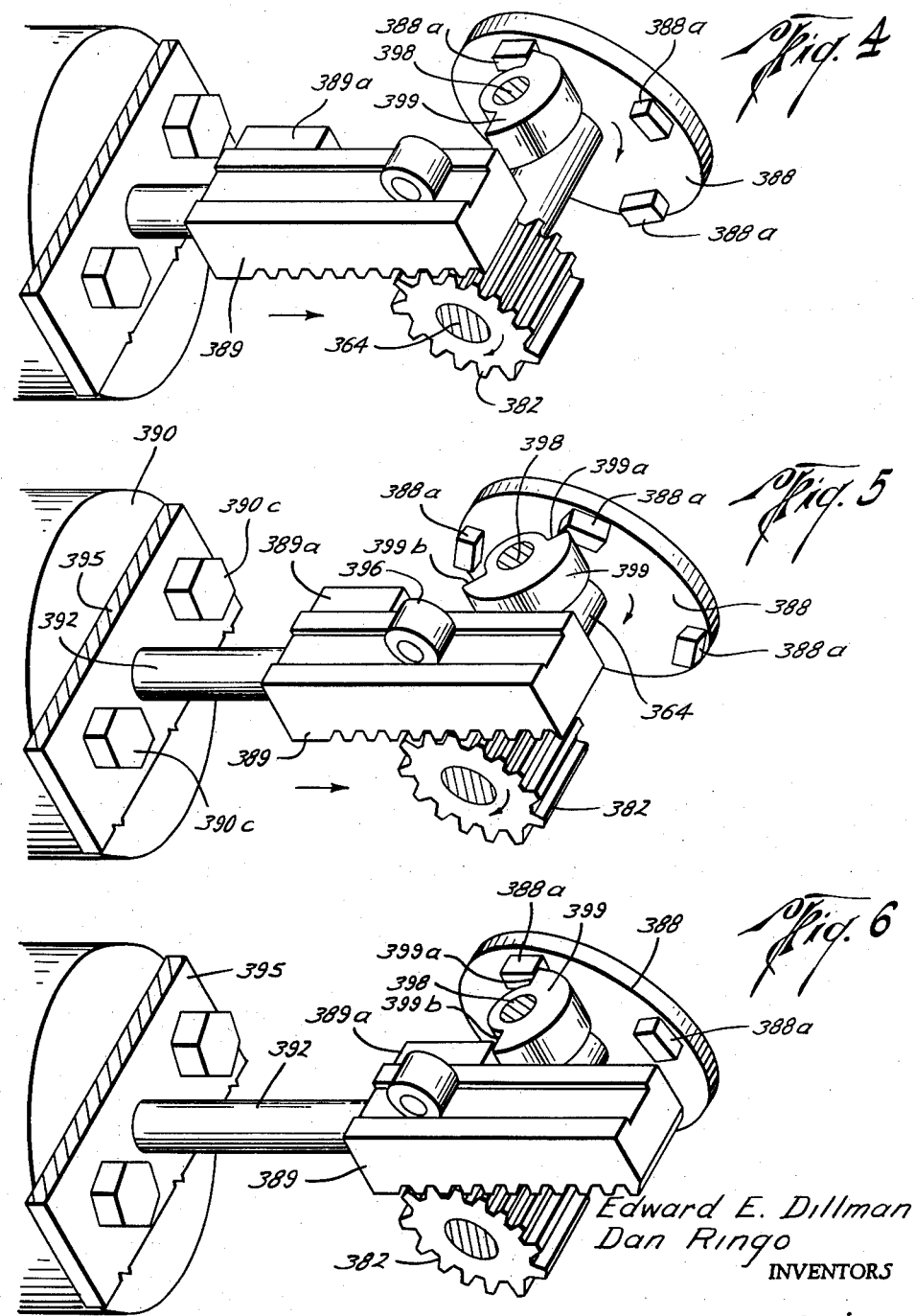

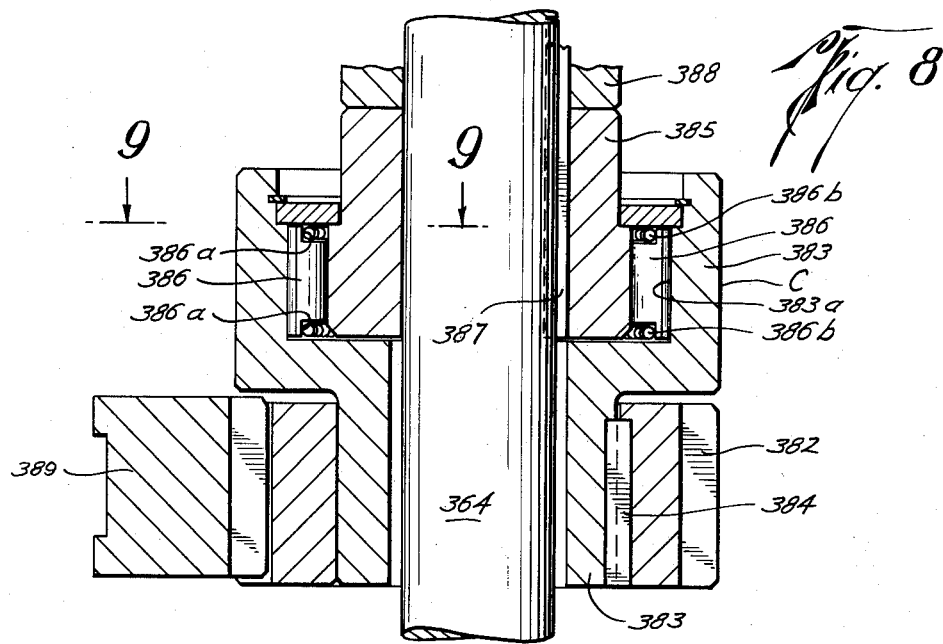
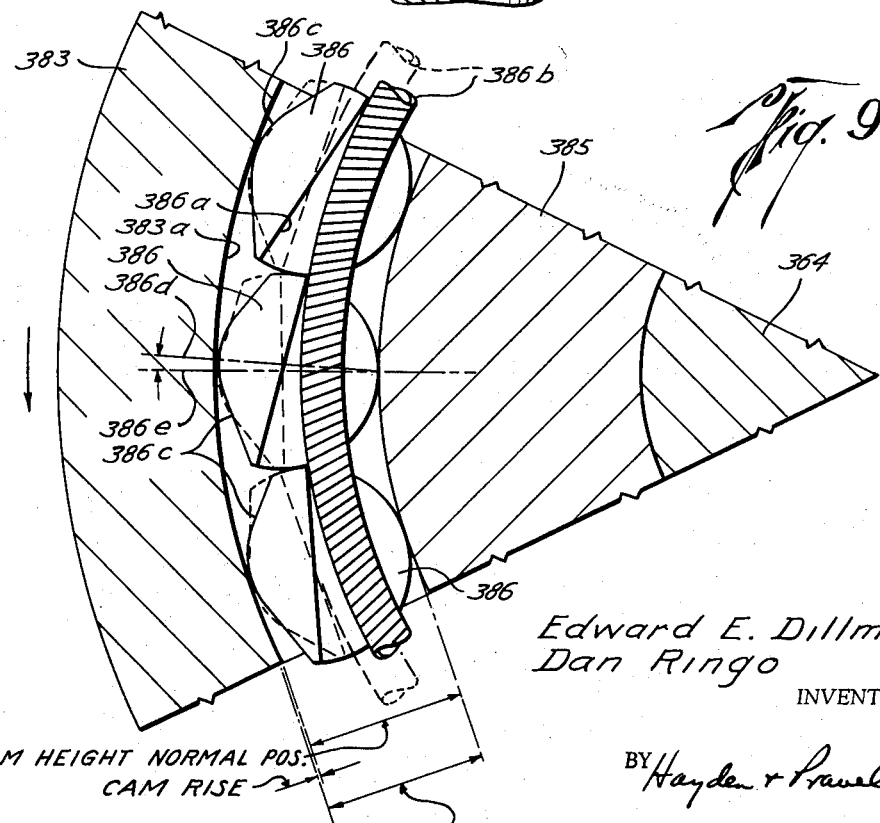

United States Patent Office

3,040,592
Patented June 26, 1962

3,040,592
VALVE ACTUATING MECHANISM
Edward E. Dillman and Dan Ringo, Houston, Tex., assignors to Engineers & Fabricators, Inc., Houston, Tex., a corporation of Texas
Filed Apr. 10, 1958, Ser. No. 733,776
2 Claims. (Cl. 74—130)

This invention relates to new and useful improvements in mechanisms for actuating valves, particularly multi-port rotary valves.

This application is a continuation-in-part of United States patent application Serial No. 662,534, filed May 29, 1957, now abandoned, which application was a division of United States patent application Serial No. 551,816, filed December 8, 1955, now abandoned.

An object of this invention is to provide a new and improved operating mechanism for a multi-port rotary valve.

Another object of this invention is to provide a new and improved operating mechanism for a multi-port rotary valve which is adapted to be rotated in one direction without reversal for shifting to its different ports and wherein the operating mechanism has means therewith for lifting the rotary valve member off its seat when rotating same to its different port positions.

A further object of this invention is to provide a new and improved operating mechanism for controlling the rotation of a multi-port rotatable valve member in a rotary valve to assure proper positioning of the valve member at each of its ports successively.

A particular object of this invention is to provide a new and improved actuating mechanism for seating and unseating a rotary valve and for rotating the rotatable valve member of the valve when it is unseated, wherein the actuating mechanism includes a positive stop means for stopping the rotation of the rotatable valve member at each desired position without requiring frictional contact between the rotatable valve member and the rest of the valve prior to reaching each such desired position.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 2 is a view taken on line 2—2 of FIG. 1;

FIG. 3 is a view taken on line 3—3 of FIG. 1, with portions of the valve being shown in dotted lines;

FIG. 4 is a perspective view of the stop means of the actuating mechanism of FIG. 1 in position for the start of a stroke to shift the valve member;

FIG. 5 is a view similar to FIG. 4, except the stop means is in an intermediate position;

FIG. 6 is a view similar to FIG. 4, except the stop means is in its final stop position;

FIG. 8 is an enlarged view of a portion of FIG. 1, illustrating details of one type of one-way clutch which may be used; and FIG. 9 is a view taken on line 9—9 of FIG. 8.

Figure 1:
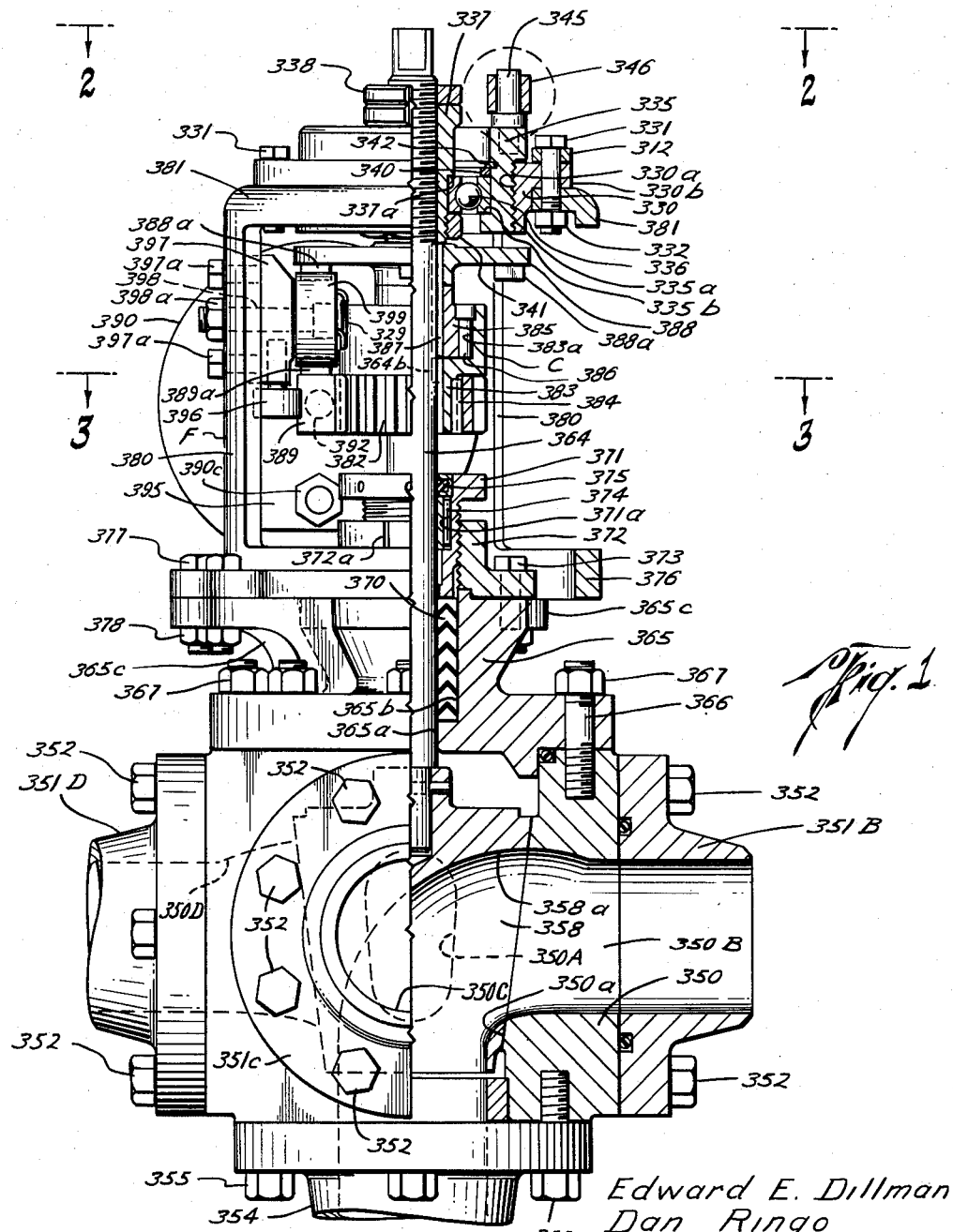
FIG. 1 is a view, partly in elevation and partly in section, illustrating one form of the actuating mechanism and valve.
Figure 7:
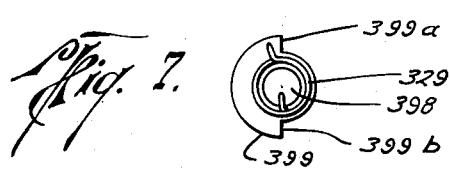
FIG. 7 is a side view of the pivoted stop lever used with the actuating means of this invention.

In FIGS. 1–7 of the drawings, a construction is shown wherein an actuating means for moving a valve stem is illustrated, although it will be appreciated that this invention is not limited to use with a valve stem.

Considering first the construction of the valve itself, the valve body 350 has a central longitudinal bore 350a which is tapered to conform with the external surface of the rotatable valve member 358. The body 350 has laterally extending openings 350A, 350B, 350C (not shown) and 350D. Each of the lateral openings 350A–350D has a flanged pipe or tube connected therewith, and in FIG. 1, flanged pipes 351B and 351D are illustrated for the openings 350B and 350D, respectively, of the body 350. Such flanged pipes 351B and 351D and the corresponding pipes which are provided for the openings 350A and 350C are preferably connected to the body 350 with suitable retaining bolts 352 or similar securing means. The lower portion 350b of the valve body (as viewed in FIG. 1) below the tapered portion 350a of the valve bore is preferably substantially longitudinal or vertical and is provided with a metal insert 353 which is in the form of a metal ring having the same inner diameter as the central passage 358a which extends through the valve member 358 for establishing fluid communication between one of the lateral ports 350A–350D and the bore of the insert ring 353. A flanged pipe or tube 354 is connected to the body 350 with retaining screws or bolts 355 or other suitable securing means so that such tube 354 is aligned with the opening 358a of the valve member 358 for flow to or from the tube or pipe 354 to one of the tubes or pipes 351A–351D.

It will be observed in FIG. 1 that half of the pipe 351c is shown. It should also be pointed out that the inner shape of the openings 350A–350D is substantially elliptical as shown in dotted lines in connection with the opening 350A and it is shaped down to a substantially cylindrical opening as it appears in connection with the portion 350C illustrated in FIG. 1. However, the particular shape of the openings 350A–350D may vary within the skill of the art and the particular shape illustrated is merely to provide streamlined flow through the valve.

The valve member 358 is connected to an operating shaft 364 with a removable locking pin 364a or any other suitable securing means. A flanged closure plate 365 is secured to the upper end of the valve body 350 to close same except for the central opening 365a therethrough for receiving the shaft 364. The closure flange 365 is secured to the body 350 with stud bolts 366 and nuts 367 or any other suitable securing means. A packing 370 of the Chevron-type or any other suitable packing which is annular is positioned in an enlarged bore portion 365b of the closure 365 for providing an annular seal around the shaft 364. The packing 370 is retained in the enlarged bore portion 365b and is compressed into sealing contact with the shaft 364 by means of a packing gland 371 which is threaded into a split nut 372 having internal threads which are in engagement with the external threads on the packing gland 371. The split nut 372 is secured to the closure or bonnet 365 with retaining bolts or screws 373 or any other suitable securing means. The nut 372 is preferably split as indicated at the divisions 372a and 372b (FIG. 3) to facilitate the removal of the nut 372 and the removal of the packing gland 371 for the replacement of the packing 370, but it will be understood that the particular arrangement of the packing gland 371 and the split nut 372 is not necessary to the invention. Preferably, needle bearings 374 of known construction are positioned within an enlarged diameter recess 371a of the packing gland 371 to permit relative rotation of the shaft 364 with respect to the packing gland 371. The needle bearings 374 are retained in position within the packing gland 371 by a grease seal 375 which is annular and which may be formed with a metal frame and an inner rubber ring or any other suitable known construction.

The closure or bonnet 365 has a plurality of spider arms 365c which are illustrated as being three in number (FIG. 3). Such spider arms 365c are formed integrally with the closure or bonnet 365 and provide a mounting base for the frame F for the actuating mechanism of this invention which is used with the valve. The frame F includes a lower annular ring 376 (FIGS. 1 and 3) which has three flanges 376a which have the same shape as the outer portions of the spider arms 365c for receiving locking bolts 377 and nuts 378 therewith to hold the base of the frame F to the spider arms 365c and therefore to the bonnet 365.

The frame F has a plurality of upstanding vertical support sections or legs 380, two of which are illustrated in FIG. 1 and three of which are illustrated in FIG. 3 in cross-section. Such support sections or legs 380 extend upwardly from the ring 376 and are joined together at their upper end by an upper frame ring 381 (FIG. 1).

For imparting rotation to the valve member 358 so as to successively position the opening 358a opposite each of the lateral openings 350A–350D as the valve member 358 is always rotated in the same rotational direction, an actuating mechanism is provided. Such actuating mechanism includes an annular gear 382 which is keyed to a lower annular segment 383 of a one-way clutch C by means of a key 384 whereby the gear 382 is rotatable with the annular segment 383 of the one-way clutch C. The one-way clutch C is of any standard known construction and it includes, in addition to the annular clutch segment 383, another clutch segment 385 which is also annular in shape and which fits within the inner bore 383a of the annular clutch segment 383. Rollers 386 of a known type are positioned in the bore 383a for frictional engagement with the clutch segments 383 and 385 to permit rotation of the clutch segments 383 and 385 together in one rotational direction. Thus, as illustrated in particular in FIGS. 8 and 9, each of the rollers 386 has a projection forming a flat surface 386a at each end, which surfaces are engaged by a coil garter type spring 386b, to urge such rollers 386 outwardly. Such outward urging maintains the cam surface 386c in contact with the inner race 383a of the clutch segment 383. Because of the curvature of the cam surface 386c, each cam 386 has a maximum thickness along a line 386d (FIG. 9), which is preferably the center line of each cam 386. Each roller 386 is adapted to shift from a normal point of contact indicated at line 386e to a point of contact at or near line 386d. When the clutch segment 383 is rotated (in the counterclockwise direction as viewed in FIG. 9) by the movement of the rack 389 from the position of FIG. 4 to the position of FIG. 6, the rollers 386 are caused to move by friction from the contact at the line 386e to a contact at about line 386d (dotted line position of FIG. 9). Such movement produces the cam rise indicated in FIG. 9 and locks the clutch segments 383 and 385 together so that the segment 385 and the valve stem 364 move counterclockwise with the segment 383.

Upon a reverse rotation of the segment 383 (clockwise as viewed in FIG. 9) by a reverse movement of the rack 389 from the FIG. 6 position to the FIG. 4 position, the rollers 386 shift or rock so that the cam surfaces 386c are in contact at about lines 386e (solid line position of FIG. 9) to permit the segment 383 to slide or slip over the rollers 386 without moving them. Therefore, the drive between such clutch members 383 and 385 is disengaged because the rollers 386 slide freely therebetween when the clutch segment 383 is rotated in the other rotational direction (clockwise), whereby rotation which is imparted to the clutch segment 383 is imparted to the clutch segment 385 in only one rotational direction. The purpose of such one-way clutch C will be more evident hereinafter.

The inner clutch segment 385 is mounted on the shaft 364 and it is keyed thereto with a key 387 which fits within a longitudinally extending keyway 364b which is longer than the length of the key 387 to permit longitudinal movement of the shaft 364 relative to the key 387 for the unseating of the valve member 358 and the subsequent reseating thereof, as will be explained. The key 387 also connects a rotatable stop plate 388 to the shaft 364 so that the inner clutch segment 385 and the stop plate 388 are keyed together for rotational movement together with the shaft 364. Thus, any rotational movement which is imparted to the clutch segment 385 is likewise transmitted to the stop plate 388. The stop plate 388 has a plurality of stop members or lugs 388a, two of which are completely shown in FIG. 1 and the third one being shown partially. In actual practice, there would be a stop member or lug 388a for each of the ports or openings 350A–350D of the valve body 350 and they would be spaced on the rotatable plate 388 in the same relative relationship as the valve openings 350A–350D. Thus, since the valve illustrated in FIG. 1 has four openings 350A–350D, there ar four stop members or lugs 388a on the rotatable plate 388 and the stop members or lugs 388a are spaced ninety degrees from each other since the valve openings 350A–350D are spaced ninety degrees from each other.

Rotation is imparted to the gear 382 by means of a rack 389 (FIGS. 1 and 3) having teeth thereon which engage with the teeth of the gear 382 (FIG. 3). The rack 389 is moved by any suitable power source, but as illustrated in FIG. 3 in particular, a power cylinder 390 having a piston 391 therein and a piston rod 392 connected from the piston 391 to the rack 389 is preferably employed. Suitable power means such as air or hydraulic fluid is admitted to either side of the piston 391 in the known manner for moving the piston 391 in either direction desired. Suitable fluid inlets 390a and 390b are illustrated in FIG. 3 for admitting and exhausting the fluid to and from the cylinder 390 in the known manner. The piston cylinder 390 is preferably mounted on the main frame F by means of a laterally extending frame section or bracket 395 which is best seen in FIG. 3. A suitable retaining member such as the bolt 390c is utilized for connecting the cylinder 390 to the frame bracket 395.

The rack 389 is maintained in proper engagement with the gear 382 by means of a back-up roller 396 which is rotatably mounted on a support bracket 397 secured to one of the upright frame supports or legs 380 (FIGS. 1 and 3). The bracket 397 is secured to such leg 380 with any suitable securing means such as the bolts or screws 397a. A central pivot bolt 398 is mounted through a central opening of the bracket 397 and is held in position with a nut 398a on the bracket 397 for supporting a stop lever 399 thereon. The stop lever 399 is mounted for pivotal movement about the pivot bolt or pin 398 and preferably a spring 329 (FIG. 1) is utilized for maintaining the lever 399 in a desired position when there are no forces externally acting thereon. The construction of the pivoted stop lever 399 is best seen in FIGS. 4–6 which are somewhat schematic to illustrate the operation of such stop lever 399 in conjunction with the rest of the actuating mechanism of this invention. The stop lever 399 has one surface 399a on one side of the pivot pin or bolt 398 which is adapted to be engaged by each of the stop lugs 388a successively, as will be explained. The lever 399 has another stop surface 399b on the other side of the pivot pin 398 from the surface 399a and such surface 399b is adapted to be engaged by a stop block 389a which is mounted on the rack 389 (FIGS. 1 and 3-6). As will be explained more in detail hereinafter, the movement of the rack 389 from the position shown in FIG. 4 imparts a rotation to the gear 382 and through the one-way clutch C (which has been omitted from FIGS. 4-6 for illustration purposes), such movement is transmitted to the rotatable plate 388. The stop lug 388a which is in engagement with the stop surface 399a of the stop lever 399 at the beginning of such stroke of the rack 389 is thus turned in a clockwise direction as viewed in FIG. 4 and it causes the lever 399 to pivot about its pivot bolt or pin 398 as illustrated in FIG. 5. As the movement of the rack 389 continues, the rotation of the gear 382 and the plate continues until the next lug 388a reaches the stop surface 399a and simultaneously the stop block 389a reaches the stop surface 399b of the stop lever 399 as best illustrated in FIG. 6, at which time the movement of the rack 389 is stopped and likewise the movement of the rotatable plate 388 is stopped since the stop lug 388 which is in contact with the stop lever 399 and the stop lug 389a which is also in contact with the stop lever 399 prevent the lever 399 from pivoting. Therefore, since the lever 399 is fixed to the frame F, it will be evident that further movement of the rack 389 and the plate 388 is prevented. It should be noted that the spring 329 has one end connected to the lever 399 and the other end connected to the pivot pin 398 so that after the stop lug 388 moves past the lever 399 as seen in FIG. 5, the spring 329 returns the lever 399 to the position shown in FIG. 4 and FIG. 6 to present the stop surfaces 399a and 399b in the proper relationship for subsequent contact by the stop block 389a and the next stop lug 388a as shown in FIG. 6. It will be understood of course that other means besides the spring 329 could be utilized for returning the lever 399 to its original position after the stop lug 388a has initially caused it to pivot. For example, the lever 399 may be weighted at its lower portion for utilizing gravity to return the lever 399 to its proper position if so desired.

For unseating and reseating the valve member 358 from the seat provided in the bore 350A of the valve body 350 so that the valve member 358 may be rotated without frictional engagement between the valve member 358 and the body 350, means are provided for longitudinally moving the shaft 364 and therefore also for longitudinally moving the valve member 358 with respect to the valve body 350. The form of the invention shown in FIGS. 1 and 2 in particular for effecting such longitudinal movement of the shaft 364 includes an internally threaded sleeve 330 which has internal threads 330a formed therein. An annular flange 330b is formed on the ring or sleeve 330 and a plurality of bolts 331 extend through the flange 330b and through the upper frame ring 381 (FIG. 1). A nut 332 is secured to the lower end of each of the bolts 331. It will of course be appreciated that other securing means for fastening the threaded sleeve 330 to the frame F may be provided. Within the internally threaded sleeve 330 there is provided a rotatable operating ring 335 which has external threads 335a which are in threadded engagement with the internal threads 330a of the sleeve 330. When the operating sleeve 335 is rotated, there is a co-action between the threads 335a and 330a which causes the operating ring 335 to move longitudinally with respect to the sleeve 330 because of the fact the sleeve 330 is anchored to the frame F with the bolts 331 and the nuts 332. Such longitudinal movement of the internal threaded ring 335 is transmitted to the shaft 364 through a bearing 336 which is mounted between the ring 335 and a spacer sleeve 337. The sleeve 337 is threaded to the shaft 364 and therefore may be considered integral therewith. A lock nut 338 holds the sleeve 337 in a fixed position with respect to the shaft 364. The bearing 336 is in engagement with an annular shoulder 337a of the threaded sleeve 337 and it is also in engagement with an annular shoulder 335b on the interior of the threaded ring 335. Thus, longitudinal movement of the ring 335 vertically upwardly is transmitted through the shoulder 335b to the bearing 336 and then through the shoulder 337a to the sleeve 337 and thus to the shaft 364. Movement of the threaded ring 335 downwardly is transmitted through the bearing 336 to the sleeve 337 through confining rings 340 and 341. The ring 340 is held in position with a snap ring 342 of known construction and the ringe 341 is threaded to the sleeve 337. Thus, longitudinal movement of the threaded ring 335 with respect to the frame in either direction is transmitted to the shaft 364.

For imparting the rotational movement to the ring 335, any suitable power means may be employed, but as illustrated in the drawings, and particularly in FIGS. 1 and 2, the sleeve 335 has a pivot pin 345 extending therefrom and such pin 345 extends through an opening in a connecting block 346. The block 346 is connected to a piston rod 347 extending from a piston 348 which is mounted in a cylinder 349. The cylinder 349 is of conventional construction for admitting and exhausting air or other fluid for operating the piston 348 in both directions as desired. Therefore, the rod 347 is moved laterally for imparting rotational movement to the threaded sleeve 335 to effect the longitudinal movement of the shaft 364.

Due to the fact that the pivot pin 345 and therefore the block 346 follows an arcuate path as it imparts rotation to the sleeve or ring 335, the piston cylinder 349 is mounted in a position for swinging movement about trunnion pins 310 extending from either side thereof through suitable openings in mounting brackets 311 and 312. The cylinder 349 is thus free to rotate about the trunnion pins 310 in a clockwise or counterclockwise direction to the mounting brackets 311 and 312 as viewed in FIG. 2. The bracket 312 is attached to the sleeve 330 with the same bolts 331 which are used to connect the sleeve 330 to the frame member 381 as previously described. The mounting bracket 311 is then connected to the lower bracket 312 with screws 315 or any other suitable securing means.

It is desirable to limit the movement of the block 346 as it rotates the threaded ring 335 in moving the valve member 358 and the shaft 364 vertically upwardly. For this purpose, the bracket 312 extends as illustrated in FIG. 2 for receiving an adjustable stop bolt 316 which is threaded into a boss 317 having a lock nut 318 therewith. Thus, as the piston rod 347 and the block 346 move the sleeve 335 in a direction towards the stop bolt 316, the stroke of the rod 347 is limited when the block 346 contacts the stop bolt 316. The movement of the block 346 in the other direction, that is, away from the stop bolt 316 does not include a stop means because the seating of the valve member 358 in the bore 350a of the valve body 350 stops the movement of the rod 347 and assures a firm and proper seating of the valve member 358 in the body 350. It can therefore be appreciated that as the sleeve 335 is moved in a counterclockwise direction as viewed in FIG. 2, the ring 335 will move longitudinally upwardly as viewed in FIG. 1 to move the shaft 364 upwardly and also the valve member 358 upwardly. Such upward movement continues until the block 346 contacts the stop bolt 316. The rotational movement of the valve member 358 to the next port or valve position occurs while the valve member 358 is thus unseated from the valve seat 350a. After the rotation of the valve member 358 to its next valve position with the port 358a of the valve member 358 in alignment with the next lateral port of the valve body 350, then the direction of movement of the piston 348 is reversed and is therefore in a direction to move the ring 335 in a clockwise direction as viewed in FIG. 2 for moving the shaft 364 downwardly as viewed in FIG. 1 for reseating the valve member 358. By utilizing the screw means for longitudinally moving the shaft 364, a smoother action is obtained in the unseating and reseating of the valve member 358 as compared to a straight axial or longitudinal movement. Also, the vertical height of the equipment is reduced because the mechanism for moving the shaft 364 longitudinally can be placed laterally rather than vertically. Furthermore, a mechanical advantage is obtained by using the screw action rather than a direct longitudinal force in moving the shaft 364.

The operation of the form of the invention shown in FIGS. 1–6 is believed evident from the foregoing description. During such operation, the valve member 358 is rotated in the same direction for shifting the valve member 358 to different valve positions, i.e., different positions with respect to the different lateral openings 350A–350D. In other words, the valve member 358 is rotated in only one direction and such direction would be counterclockwise as viewed in FIG. 3. Thus, with the valve member 358 in the position shown in FIG. 1 with the opening 358a therethrough in alignment with the lateral opening 350B of the valve body 350, the valve member 358 would be rotated in a counterclockwise direction (as viewed in FIG. 3) to next position the opening 358a in alignment with the lateral opening 350A of the valve body 350. The valve member 358 would be initially unseated from its seat 350a by operating the piston 348 to move the rod 347 towards the stop nut 316 for imparting a rotation to the threaded ring 335 in a counterclockwise direction (FIG. 2) to thereby lift the shaft 364 and the valve member 358. Such lifting is stopped upon the contact of the block 346 with the stop nut 316.

While the valve member 358 is thus unseated from its valve seat, the piston 391 is actuated with fluid pressure or other suitable source of power to move the rack 389. The initial position of the rack 389 is shown in FIGS. 3 and 4. The rack 389 is moved in the direction indicated by the arrow in FIG. 4 to impart rotation to the gear 382. Such movement of the gear 382 is imparted through the one-way clutch C (FIG. 1) to the shaft 364 and also to the rotatable stop plate or member 388. For purposes of illustration, the one-way clutch C is not illustrated in FIGS. 4–6, but it will be understood that the construction in FIGS. 4–6 is identical with that shown in FIGS. 1, 8 and 9 of the drawings. The initial rotation of the plate 388 causes the stop lug 388a which is in contact with the stop lever 399 to pivot such lever 399 about its pivot pin or bolt 398 so as to let the lug 388a which is in contact with the lever 399 pass the lever 399 as indicated at FIG. 5 of the drawings. After the lug 388a has passed the lever 399, the spring 329 or any other suitable means returns the lever 399 to the position shown in FIG. 4 wherein the faces or surfaces 399a and 399b are substantially perpendicular to the direction of movement of the rack 389. As the movement of the rack 389 continues, the movement of the plate 388 continues and substantially simultaneously, the lever 399 is contacted by the next stop lug 388a and the stop block 389a as shown in FIG. 6. Upon such contact, the lever 399 is prevented from pivoting since it is engaged on both sides of the pivot pin or bolt 398. Therefore, since the pivot lever 399 is fixed to the frame through the mounting bracket 397 (FIG. 1), the rack 389 can no longer move in the direction towards the lever 399 and likewise the plate 388 can no longer rotate in such direction. When the stopped position such as illustrated in FIG. 6 is thus reached, the opening 358a in the valve member 358 has been positioned in correct alignment with the opening 350A of the valve body 350. Then the valve member 358 is reseated by moving the valve member 358 and the shaft 364 longitudinally downwardly.

The downward movement of the shaft 364 is accomplished by rotating the nut or ring 335 in a clockwise direction as viewed in FIG. 2 by moving the piston 348 in a direction away from the stop nut 316. The downward longitudinal movement of the valve member 358 and the shaft 364 is stopped when the valve 358 is reseated on the valve seat 350a.

In order to position the rack 389 for the next stroke to shift the valve member 358 to the next position for aligning the opening 358a with the opening 350D, the rack 389 is reversed in its direction of movement so that it imparts a clockwise direction rotation to the gear 382 as viewed in FIG. 3. Such clockwise rotation of the gear 382 is not transmitted to the shaft 364 because the one-way clutch C does not transmit such rotation, as will be well understood. Thus, the gear 382 merely spins freely with the clutch segment 383 about the rollers 386 and the clutch segment 385 remains stationary along with the rotatable plate 388. Therefore, the lug 388a on the plate 388 which was stopped in position as shown in FIG. 6 remains in such position while the stop block 389a moves backwardly to assume the position shown in FIG. 4 for the next stroke. Because of the particular actuating means as illustrated in FIGS. 1–6, the valve member 358 may remain unseated during the entire rotational movement thereof and no external frictional contact or internal frictional contact between the valve member 358 and the valve body 350 is necessary to stop the movement of the valve member 358 at the next valve position. The stop is provided positively by means of the engagement of the stop lug 388a which has been rotated to position and the stop lug 389a which co-act together through the lever 399.

The foregoing operation is continued for continuously shifting the valve member 358 as desired to the different valve positions. Any suitable control means may be utilized for controlling the operation of the fluid actuated power cylinder 390 and the other fluid actuated power cylinder 349. If desired, fluid pressure may be utilized for moving the piston 391 in one direction and spring means may be utilized for returning the piston 391 in the other direction. The same variation in construction can be accomplished with the piston arrangement which includes the piston 348 and the cylinder 349 in FIG. 2. Also, it will be appreciated that various control means could be utilized which are well known in the art for controlling and timing the operation of the pistons 391 and 348.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An indexing mechanism for use with a multi-port rotary valve having a rotatable valve stem, comprising drive means including a one-way clutch drivingly connected to said valve stem for rotating said valve stem in only one direction, a plurality of stop members mounted for rotational movement with said valve stem, stop means secured to an element of said drive means, a fixed support, a stop lever pivotally mounted on said fixed support and having a portion in the path of said stop means and engageable by said stop means during the rotational movement of said valve stem and pivotal to interpose another portion of said lever into engagement with one of said stop members for effecting the positive stopping of said stop member when the valve stem has reached each different rotational position.

2. The structure set forth in claim 1, wherein said drive means includes a gear mounted on said valve stem, a one-way clutch connected to said valve stem and said gear so that rotation of said gear in only one direction is imparted to said valve stem, a rack in engagement with said gear for rotating said gear and said valve stem therewith in said one direction only, and wherein said stop means is mounted on said rack for movement therewith into engagement with said stop lever to effect the stopping of the rotation of said valve stem.

References Cited in the file of this patent

UNITED STATES PATENTS

| | | |
|---|---|---|
| 737,996 | Bullard | Sept. 1, 1903 |
| 921,983 | Hanson | May 18, 1909 |
| 1,842,382 | Arey | Jan. 26, 1932 |
| 2,088,687 | Carlsen | Aug. 3, 1937 |
| 2,226,169 | Koehler | Dec. 24, 1940 |
| 2,505,971 | Jacobsen | May 2, 1950 |
| 2,665,589 | Rusher | Jan. 12, 1954 |
| 2,833,510 | Allen | May 6, 1958 |
| 2,871,732 | Olson | Feb. 3, 1959 |

FOREIGN PATENTS

| | | |
|---|---|---|
| 3,439 | Great Britain | of 1881 |
| 371,194 | France | of 1907 |
| 665,650 | Germany | of 1938 |